(12) United States Patent
van Zyl et al.

(10) Patent No.: US 8,459,735 B2
(45) Date of Patent: Jun. 11, 2013

(54) SEAT WITH RECESSING SECTION

(75) Inventors: Pieter J. van Zyl, Viola, WI (US); Jesse C. Boyarski, Richland Center, WI (US)

(73) Assignee: Seats, Inc., Reedsburg, WI (US)

( * ) Notice: Subject to any disclaimer, the term of this patent is extended or adjusted under 35 U.S.C. 154(b) by 112 days.

(21) Appl. No.: 13/110,649

(22) Filed: May 18, 2011

(65) Prior Publication Data
US 2012/0292955 A1 Nov. 22, 2012

(51) Int. Cl.
*A47C 7/62* (2006.01)

(52) U.S. Cl.
USPC ............... 297/188.05; 297/188.04; 297/284.1

(58) Field of Classification Search
USPC .................. 297/440.2, 188.05, 284.1, 284.4, 297/284.2, 188.04, 284.8, 383, 238, 188.4
See application file for complete search history.

(56) References Cited

U.S. PATENT DOCUMENTS

| | | | | |
|---|---|---|---|---|
| 3,288,525 | A * | 11/1966 | Cerf | 297/284.8 |
| 4,634,176 | A | 1/1987 | Scott | |
| 5,213,392 | A * | 5/1993 | Bostrom et al. | 297/188.04 |
| 5,275,462 | A | 1/1994 | Pond et al. | |
| 5,292,174 | A | 3/1994 | Ohnuma | |
| 5,314,233 | A * | 5/1994 | Bostrom et al. | 297/217.1 |
| D352,612 | S | 11/1994 | Pond et al. | |
| 5,628,543 | A | 5/1997 | Filipovich et al. | |
| 5,681,080 | A | 10/1997 | Pond et al. | |
| 5,758,924 | A * | 6/1998 | Vishey | 297/284.4 |
| 5,803,544 | A * | 9/1998 | Block et al. | 297/284.3 |
| 5,934,749 | A | 8/1999 | Pond et al. | |
| 6,079,773 | A | 6/2000 | Hassan | |
| 6,601,923 | B2 * | 8/2003 | Pond et al. | 297/484 |
| 6,655,745 | B2 * | 12/2003 | Fohrenkamm et al. | 297/481 |
| 6,688,687 | B2 * | 2/2004 | Chu | 297/284.4 |
| 6,755,467 | B1 * | 6/2004 | Chu | 297/284.1 |
| 7,040,707 | B2 | 5/2006 | Nakahara | |
| 7,303,232 | B1 * | 12/2007 | Chen | 297/284.8 |
| 7,334,841 | B2 * | 2/2008 | Chou | 297/284.4 |
| 7,357,453 | B2 * | 4/2008 | Wu | 297/284.8 |
| 7,413,249 | B2 * | 8/2008 | Leutert | 297/237 |
| 7,997,647 | B2 * | 8/2011 | Sjoquist et al. | 297/238 |
| 8,052,209 | B2 * | 11/2011 | Bostrom et al. | 297/188.04 |
| 8,152,123 | B2 * | 4/2012 | Ziaylek et al. | 248/312 |
| 2003/0047971 | A1 * | 3/2003 | Fohrenkamm et al. | 297/188.04 |
| 2005/0006935 | A1 * | 1/2005 | Chang | 297/284.4 |
| 2010/0026065 | A1 | 2/2010 | Butch et al. | |

OTHER PUBLICATIONS

Global Seating Systems, catalog, available at least as early as May 18, 2011, 12 pages, http://www.globalseating.com/GSS_all_HiRes.pdf.

* cited by examiner

*Primary Examiner* — David Dunn
*Assistant Examiner* — Alexander Harrison
(74) *Attorney, Agent, or Firm* — Michael Best & Friedrich LLP (57) ABSTRACT

A seat back assembly includes a back frame and an adjustable support mounted to the back frame. The adjustable support moves between a first position and a second position with respect to the back frame. A stationary back cushion is mounted to the back frame and defines an opening sized to receive the adjustable support. When the adjustable support is in the opening, both the adjustable support and the stationary back cushion provide support surfaces for the back of an occupant of the seat. When the adjustable support is moved toward the second position to at least partially remove the adjustable support from the opening, the opening accommodates equipment of an occupant of the seat.

20 Claims, 9 Drawing Sheets

SEAT WITH RECESSING SECTION

BACKGROUND

The present invention relates to seats and seat configurations for a vehicle.

SUMMARY

In one embodiment, the invention provides a seat assembly including a lower portion adapted to support from below an occupant of the seat, a back frame extending upwardly with respect to the lower portion, and a cushion support mechanism mounted to the back frame. The cushion support mechanism includes a support panel that moves between a first position and a second position with respect to the back frame. An actuator moves the cushion support mechanism toward the first position. A cushion release mechanism is mounted to the back frame and permits the cushion support mechanism to be moved toward the second position when actuated. A moveable back cushion is mounted to the support panel, and a stationary back cushion is mounted to the back frame and defines an opening sized to receive the moveable back cushion. Actuation of the actuator moves the moveable back cushion into the opening, so that both the moveable back cushion and the stationary back cushion provide support surfaces for the back of an occupant of the seat. Actuation of the cushion release mechanism permits the moveable back cushion to be moved in toward the second position to at least partially remove the moveable back cushion from the opening, so that the opening accommodates equipment of an occupant of the seat assembly.

In another embodiment the invention provides a seat back assembly for a vehicle seat. The seat back assembly includes a back frame and a cushion support mechanism mounted to the back frame. The cushion support mechanism includes a support panel and moves between a first position and a second position with respect to the back frame. An actuator moves the cushion support mechanism toward the first position. A cushion release mechanism is mounted to the back frame and permits the cushion support mechanism to be moved toward the second position when actuated. A moveable back cushion is mounted to the support panel, and a stationary back cushion is mounted to the back frame and defines an opening sized to receive the moveable back cushion. Actuation of the actuator moves the moveable back cushion into the opening so that both the moveable back cushion and the stationary back cushion provide support surfaces for the back of an occupant of the seat. Actuation of the cushion release mechanism permits the moveable back cushion to be moved toward the second position to at least partially remove the moveable back cushion from the opening, so that the opening accommodates equipment of an occupant of the seat.

In yet another embodiment, the invention provides a seat assembly including a lower portion adapted to support from below an occupant of the seat, a back frame extending upwardly with respect to the lower portion, an adjustable support moveable between a first position and a second position with respect to the back frame, and a stationary back cushion mounted to the back frame and defining an opening sized to receive the adjustable support. When the adjustable support is positioned in the opening, both the adjustable support and the stationary back cushion provide support surfaces for the back of an occupant of the seat. When the adjustable support is moved toward the second position to at least partially remove the adjustable support from the opening, the opening accommodates equipment of an occupant of the seat assembly.

In still another embodiment, the invention provides a seat back assembly including a back frame, an adjustable support mounted to the back frame and moveable between a first position and a second position with respect to the back frame. A stationary back cushion is mounted to the back frame and defines an opening sized to receive the adjustable support. When the adjustable support is in the opening, both the adjustable support and the stationary back cushion provide support surfaces for the back of an occupant of the seat. When the adjustable support is moved toward the second position to at least partially remove the adjustable support from the opening, the opening accommodates equipment of an occupant of the seat.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
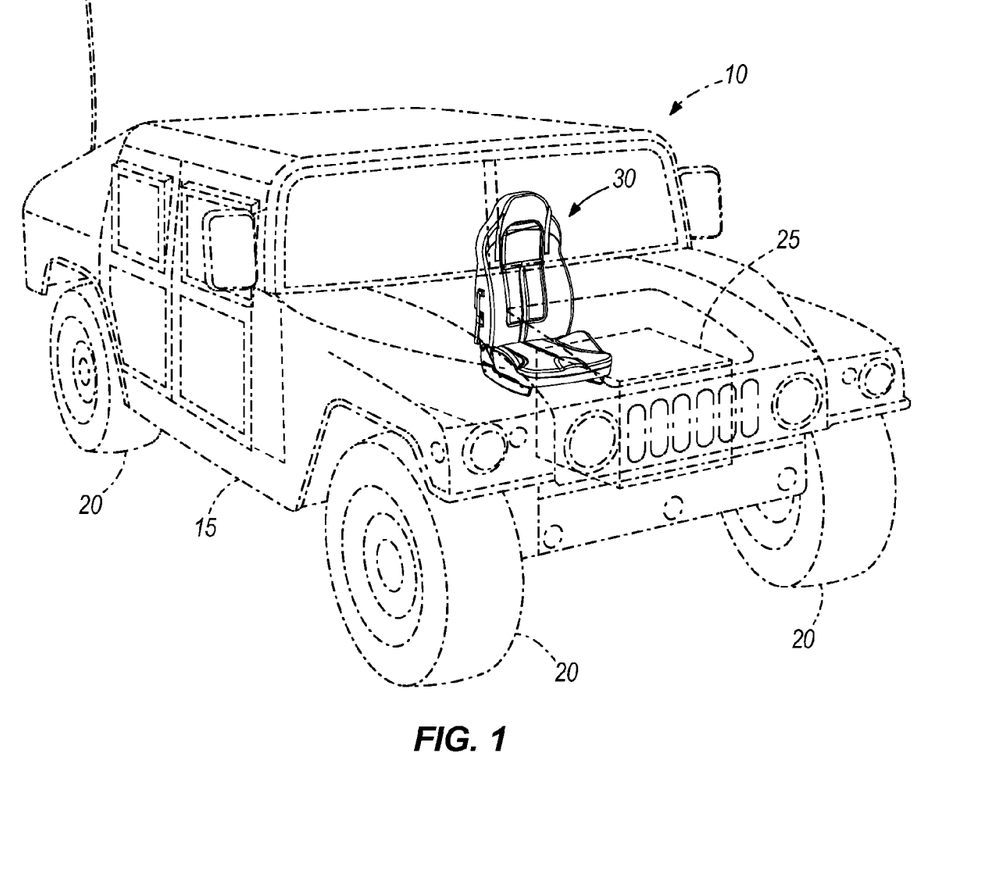
FIG. 1 is a perspective view of a vehicle including a seat according to some embodiments of the present invention.
Figure 2:
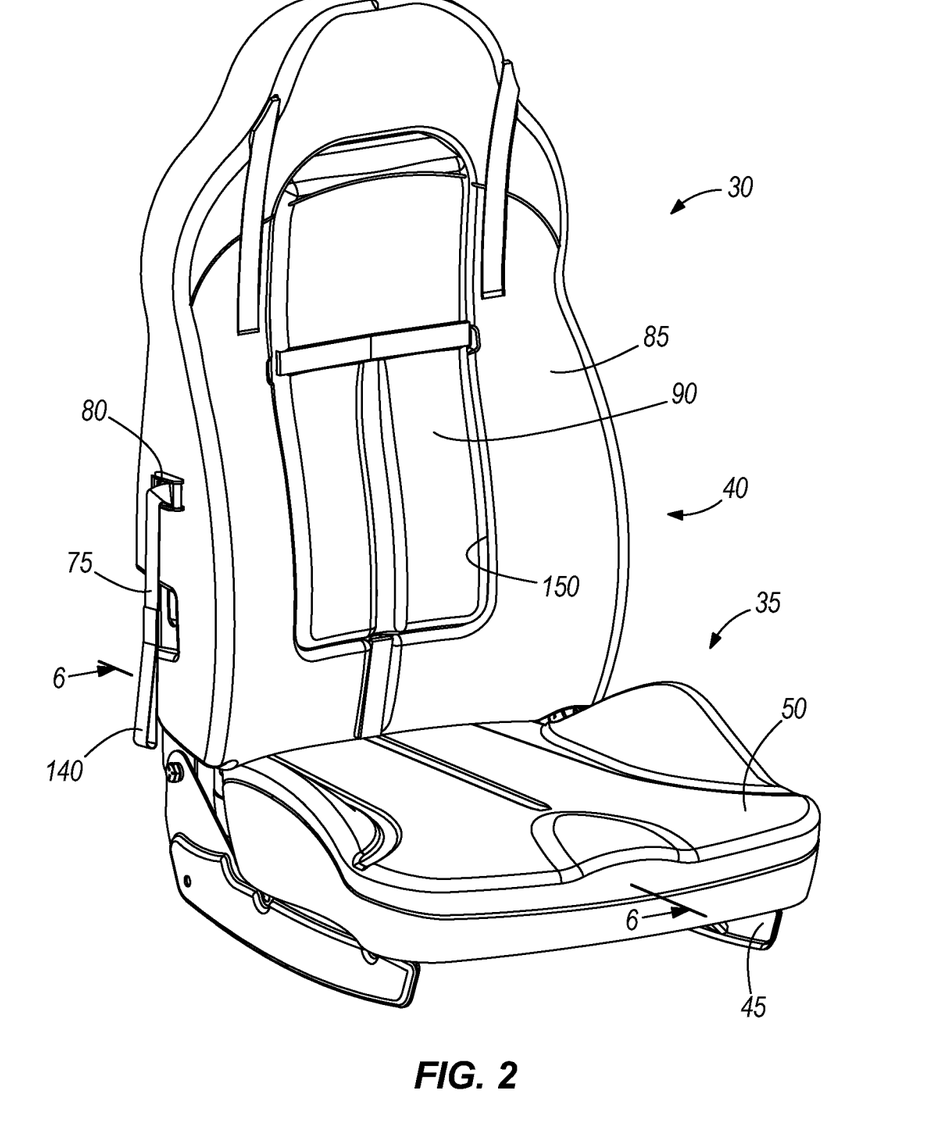
FIG. 2 is a front perspective view of the seat in a first position.
Figure 3:
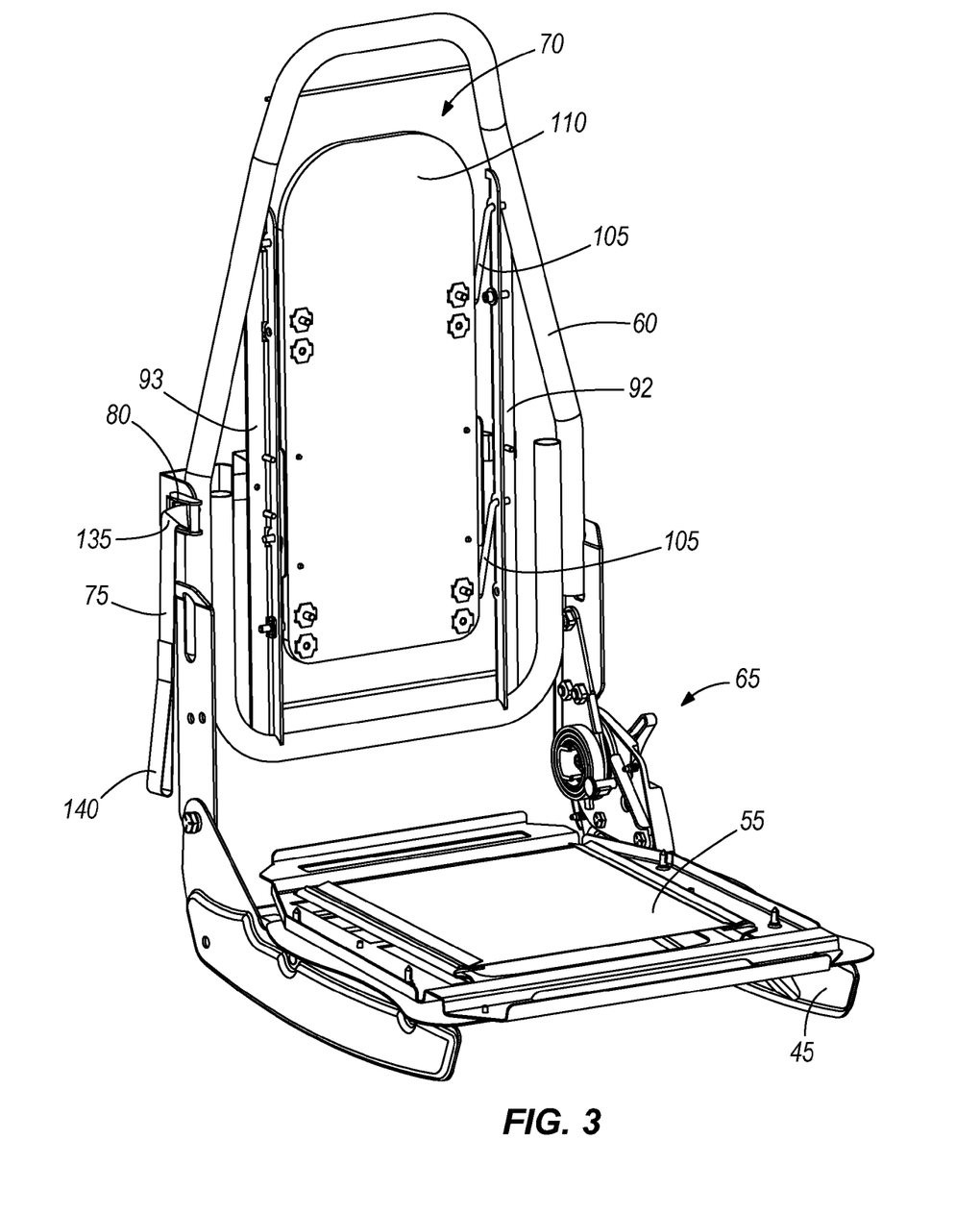
FIG. 3 is a front perspective view of the seat in the first position with the back cushions removed.
Figures 4, 5:
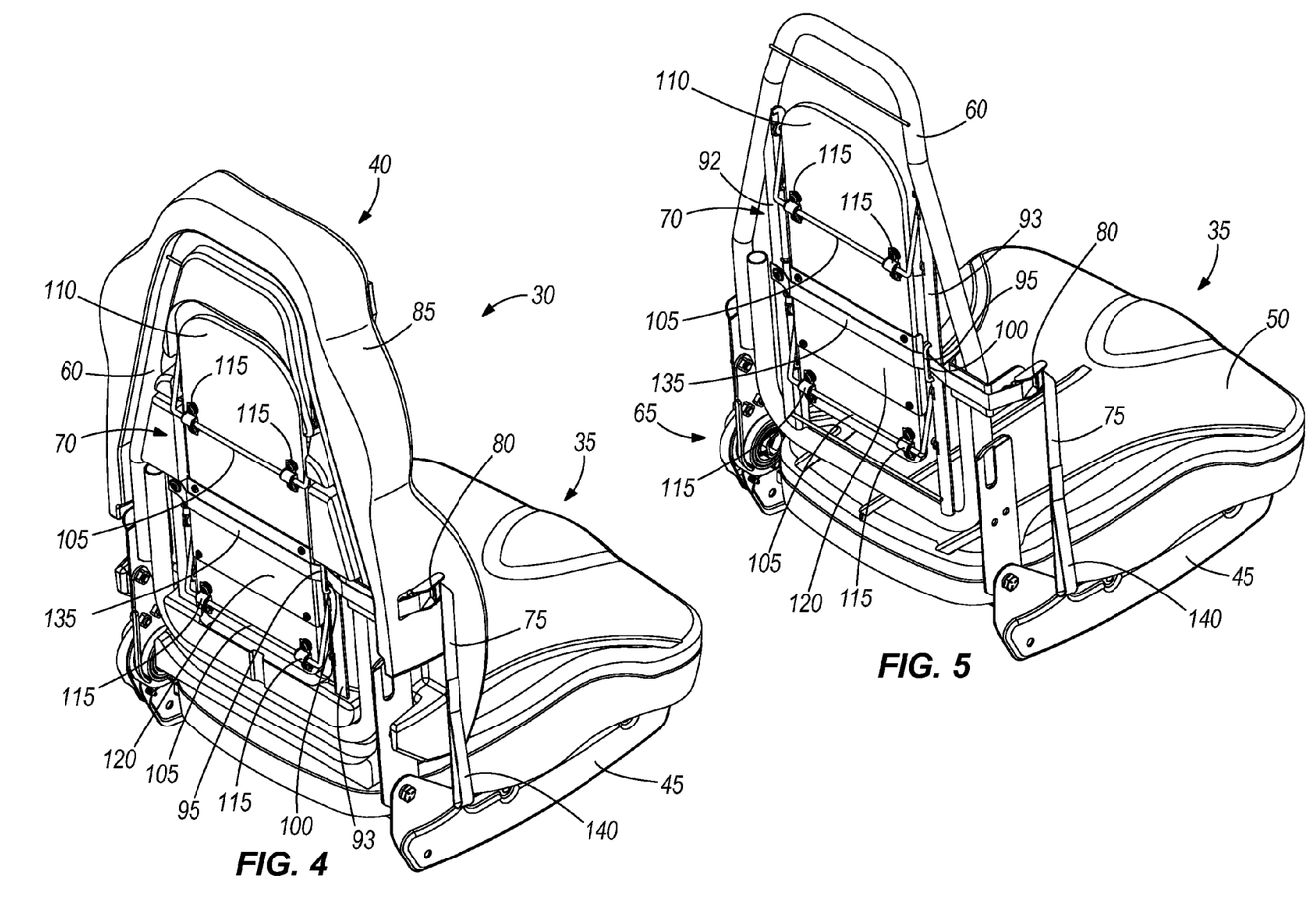
FIG. 4 is a rear perspective view of the seat of in the first position.
FIG. 5 is a rear perspective view of the seat in the first position with the back cushions removed.
Figure 6:
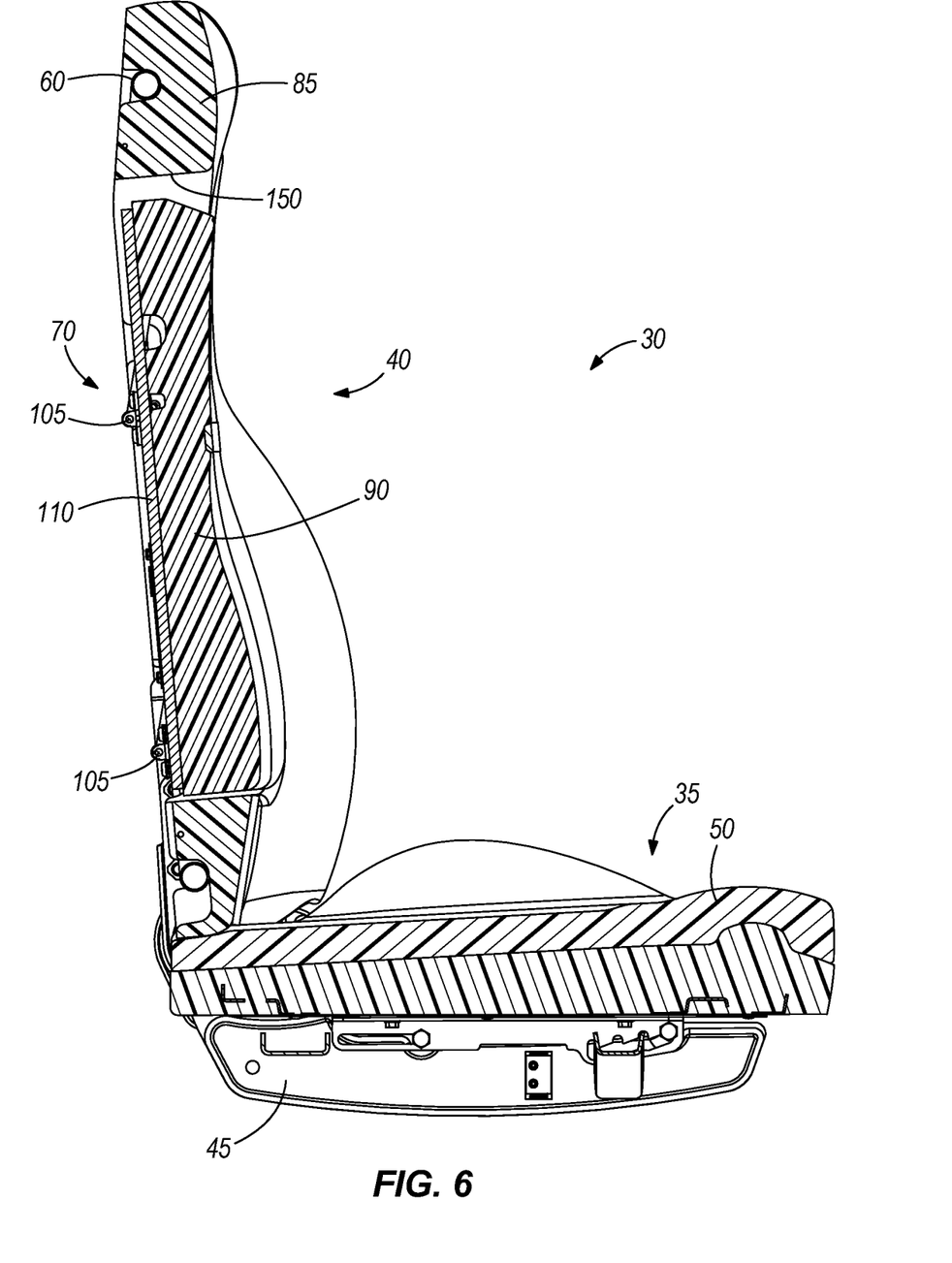
FIG. 6 is a cross-sectional view of the seat and taken along line 6-6 of FIG. 2.
Figure 7:
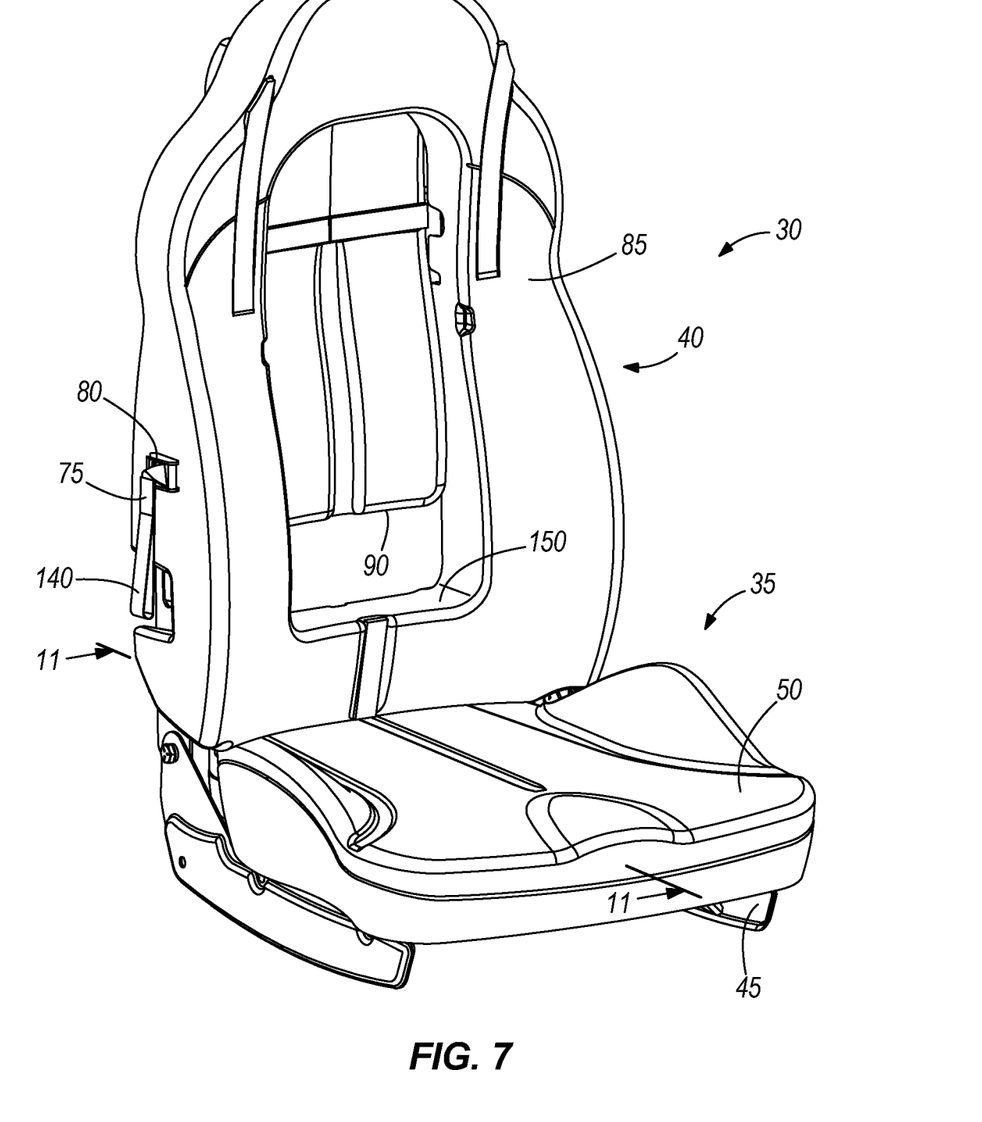
FIG. 7 is a front perspective view of the seat in a second position.
Figure 8:
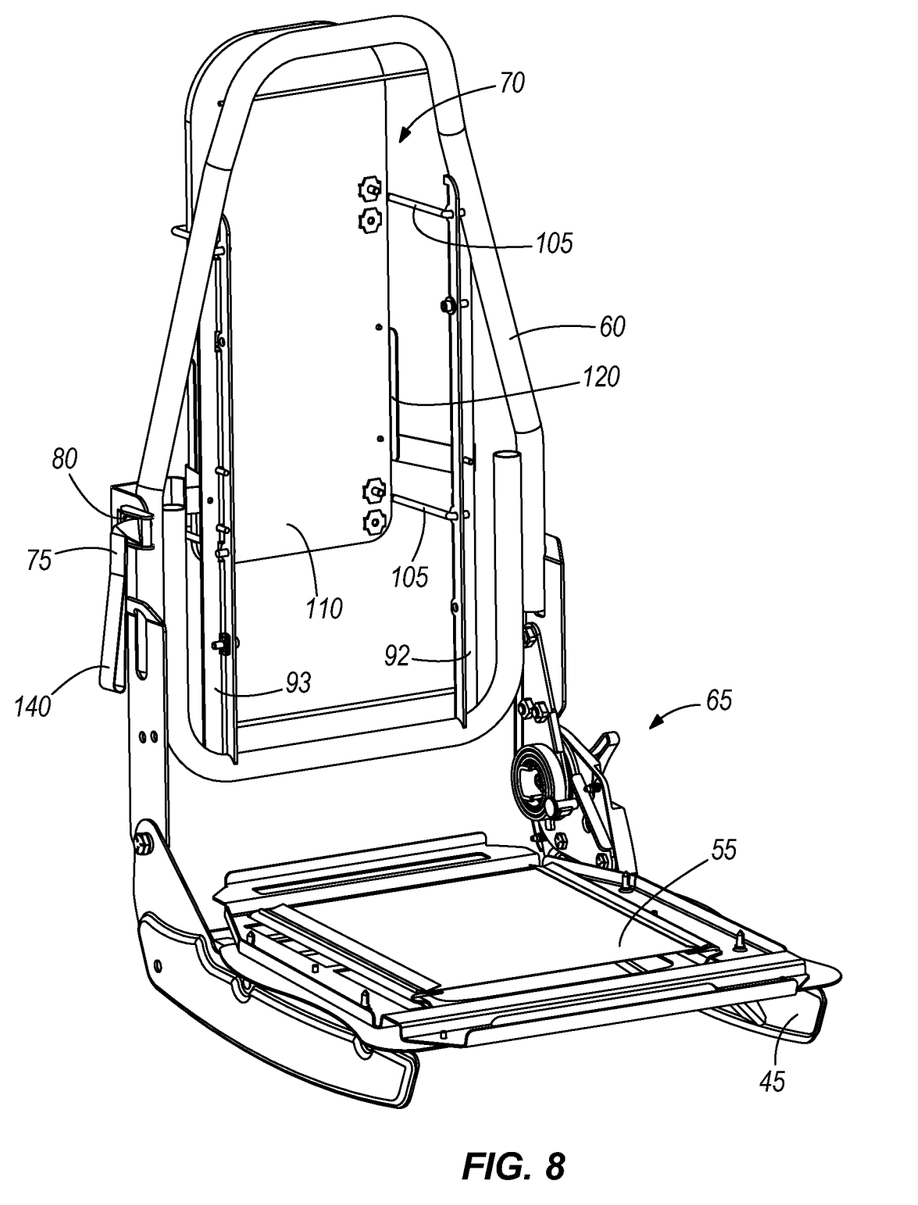
FIG. 8 is a front perspective view of the seat in the second position with the back cushions removed.
Figure 9:
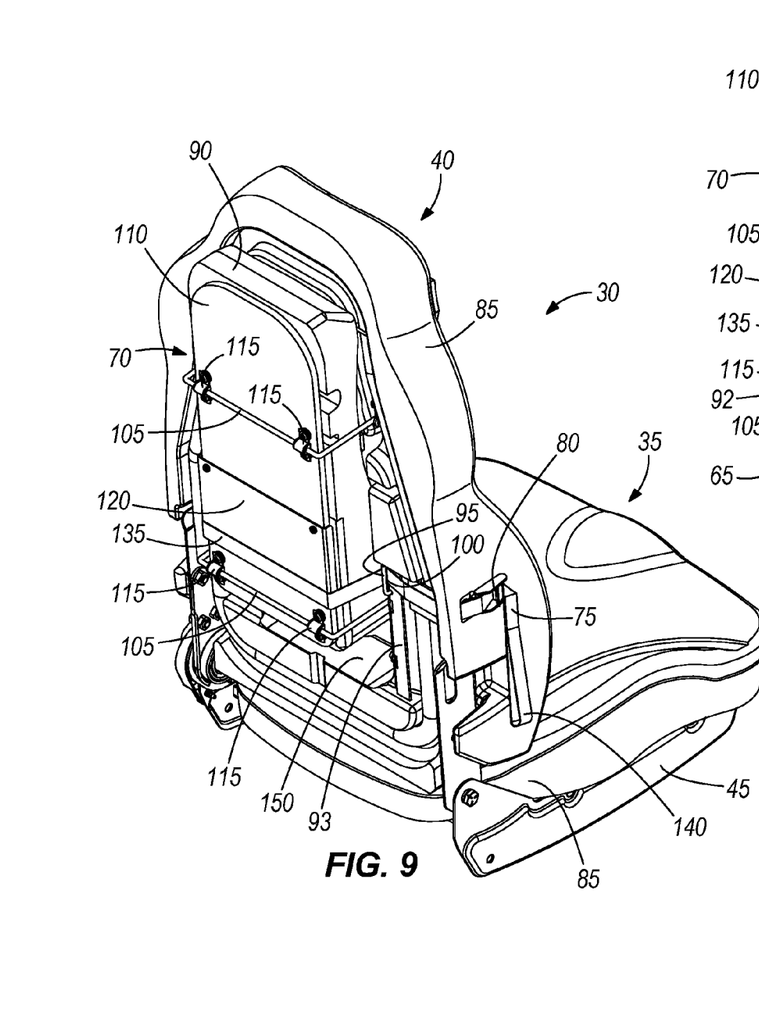
FIG. 9 is a rear perspective view of the seat of in the second position.
Figure 10:
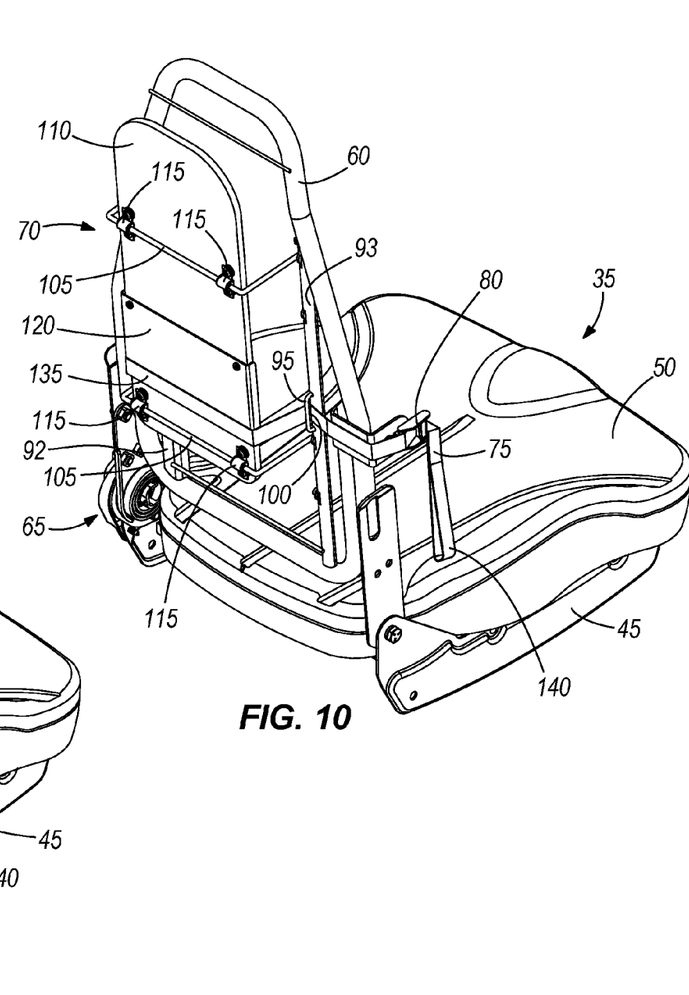
FIG. 10 is a rear perspective view of the seat in the second position with the back cushions removed.

FIG. 1 illustrates a vehicle 10 that includes a chassis 15, wheels 20 supporting the chassis 15, an internal combustion engine 25 mounted to the chassis 15, and a seat assembly 30 mounted to the chassis 15. The illustrated vehicle 10 is commonly referred to as a military vehicle, but the invention may be embodied in other types of vehicles intended for road use or off-highway vehicles; the invention is not limited to the application illustrated.

FIGS. 2-6 show the seat assembly 30 having a lower portion 35 and a seat back assembly 40. The lower portion 35 includes a lower frame 45, a lower cushion 50 and a web 55. The web 55 is coupled to the lower frame 45, and the lower cushion 50 is supported by the web 55 and the lower frame 45. The lower portion 35 is adapted to support an occupant seated thereon.

The seat back assembly 40 includes a back frame 60, an adjustment mechanism 65, a cushion support mechanism 70, an actuator 75, a cushion release mechanism 80, a stationary back cushion 85 and a moveable back cushion 90.

The back frame 60 of the seat back assembly 40 is coupled to the lower frame 45 of the lower portion 35. The illustrated back frame 60 includes an upper frame portion, a lower frame portion, and first and second connecting frame portions 92 and 93, respectively. The upper frame portion is substantially U-shaped and includes ends pointing generally downward and a generally L-shaped bracket protruding therefrom. The lower frame portion is substantially U-shaped and includes ends pointing generally upward. The downwardly pointing ends of the upper frame portion are coupled to the upwardly pointing ends of the lower frame portion, such that the upper frame portion and the lower frame portion form a substantially ovular configuration. The first and second connecting frame portions 92 and 93 each have first ends and second ends and extend substantially vertically. The first ends of the first and second connecting frame portions 92 and 93 are coupled to the upper frame portion and the second ends of the first and second connecting frame portions 92 and 93 are coupled to the lower frame portion. The second connecting frame portion 93 includes a guide loop 95 that defines an opening 100 therethrough. The illustrated back frame 60 is given by way of example only. In other embodiments, the back frame 60 has other configurations including differing quantities, shapes and locations of components.

The adjustment mechanism 65 is positioned at the connection between the lower frame 45 and the back frame 60 to permit a user to adjust an angle between the seat back assembly 40 and the lower portion 35.

The illustrated cushion support mechanism 70 includes wire links 105, a support panel 110, bushing blocks 115 and a plate 120. The wire links 105 are substantially U-shaped and each include a first end, a second end, and a middle portion between the first end and the second end. Each first end engages the first connecting frame portion 92 and each second end engages the second connecting frame portion 93. The wire links 105 are rotatably coupled to the first and second connecting frame portions 92 and 93. The wire links 105 are vertically spaced apart and their middle portions are substantially parallel. The wire links 105 are rotatable between a first orientation (see FIGS. 2-6) in which each wire link 105 (i.e., the first end, second end, and middle portion) is substantially contained within a vertical plane, and a second orientation (see FIGS. 7-11) in which each wire link 105 is substantially contained within a horizontal plane. The middle portions of the two wire links 105 define a first vertical plane in the first orientation and a second vertical plane in the second orientation.

The support panel 110 is substantially rectangular and has a front surface and a rear surface. The support panel 110 is coupled to the middle portions of the wire links 105 by the bushing blocks 115. The bushing blocks 115 permit rotation of the wire links 105 with respect to the support panel 110. The illustrated bushing blocks 115 are coupled to the rear surface of the support panel 110 by bolts, but any suitable removable or non-removable fasteners can be utilized to couple the bushing blocks 115 to the support panel 110. The illustrated bushing blocks 115 include a pipe clamp with a nylon insert. However, other suitable connections (hereinafter referred to as one or more linkages) between the wire links 105 and the support panel 110 can be utilized.

The wire links 105 and the bushing blocks 115 support the support panel 110 for movement with respect to the back frame 60. When the wire links 105 pivot with respect to the back frame 60, and the wire links 105 rotate within the bushing blocks 115, the wire links 105 rotate with respect to the support panel 110 and the support panel 110 moves with respect to the back frame 60. The support panel 110 is moveable along a range of motion between a first position (shown in FIGS. 2-6), in which the wire links 105 are in the first orientation and the support panel 110 is substantially coplanar with and surrounded by the back frame 60 and between the connecting frame portions 92, 93, and a second position (shown in FIGS. 7-11), in which the wire links 105 are in the second orientation and the support panel 110 is recessed from the back frame 60. The vertical spacing of the wire links 105 orients the support panel 110 substantially vertically in the first position, the second position, and at all positions between the first position and the second position. The support panel 110 is infinitely adjustable with respect to the back frame 60 within the range of possible positions between the first position and the second position.

Figure 11:
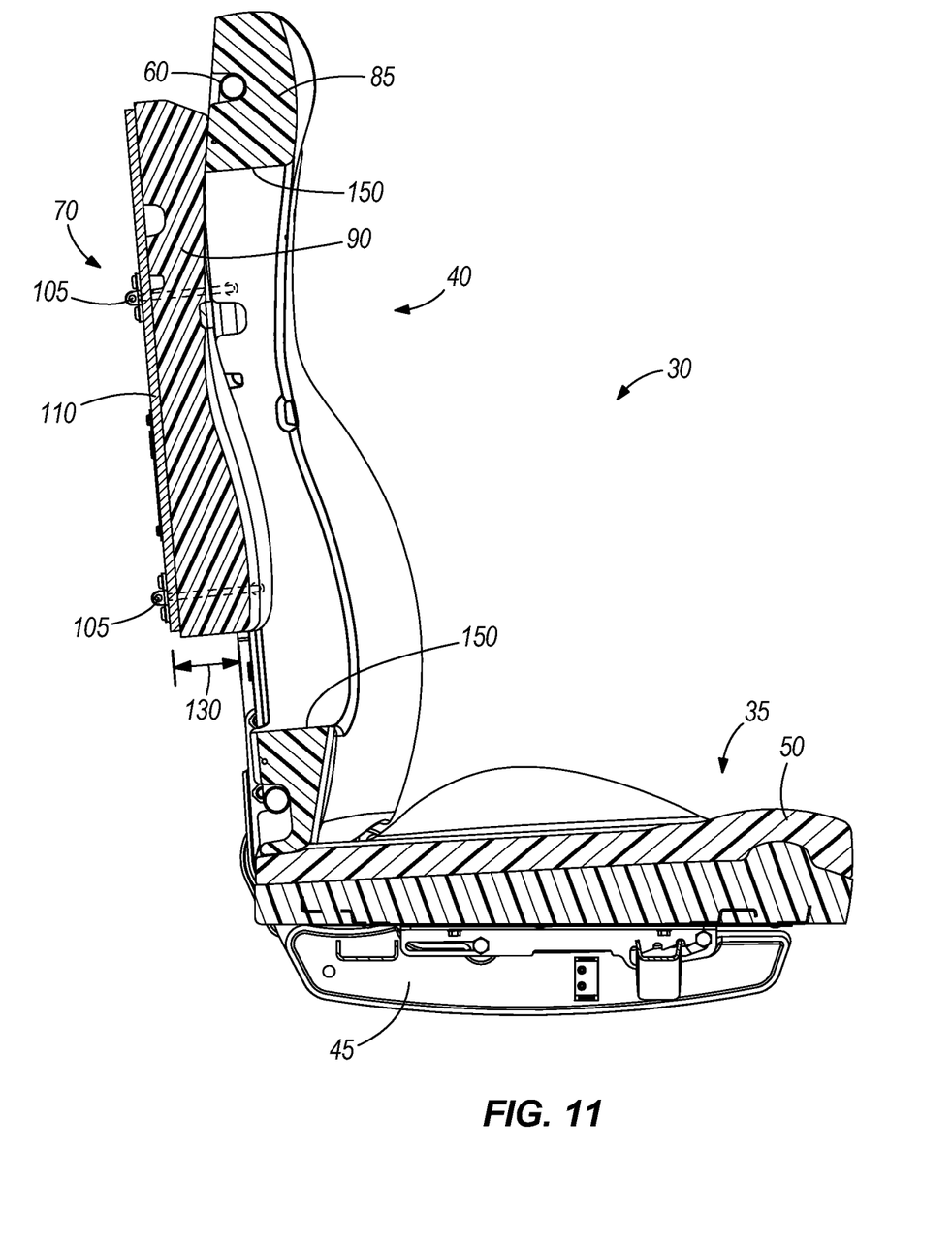
FIG. 11 is a cross-sectional view of the seat and taken along line 11-11 of FIG. 7.

The support panel 110 in the first position is spaced from the support panel 110 in the second position a maximum distance 130 (FIG. 11). The geometry of the wire links 105 determines the maximum distance 130. Specifically, the distance between the first and second ends of the wire links 105 and the middle portions of the wire links 105 determines the maximum distance 130. In some embodiments, the wire links 105 are removable and replaceable to permit adjustment of the maximum distance 130. In other embodiments, the wire links 105 are replaced by adjustable connectors which are utilized to moveably couple the support panel 110 to the back frame 60.

The illustrated support panel 110 is biased toward the first position by gravity. The illustrated support panel 110 is moveable toward the second position by a user. In another embodiment, the support panel 110 is biased toward the second position by gravity. In some embodiments, one or more biasing mechanisms can be utilized to bias the support panel 110 toward the first and/or second positions. In some embodiments, a positive locking mechanism or detent mechanism is used to selectively inhibit or prevent movement of the support panel 110 toward the first and/or second positions.

The illustrated plate 120 is coupled to the rear surface of the support panel 110 by screws. In other embodiments, other suitable fasteners can be utilized. The illustrated plate 120 is coupled to the support panel 110 between the two wire links 105. The plate 120 can be made from a different material than the support panel 110.

The illustrated actuator 75 is a strap 135 having a first end fixed to the first connecting frame portion 92, a middle portion extending across the plate 120 and through the opening 100 of the guide loop 95 on the second connecting frame portion 93 and a second end including a loop 140 defined by the strap 135 being doubled over to make an opening. The strap 135 is slideable across the plate 120 and through the opening 100 of the guide loop 95. The plate 120 provides a wear surface on the support panel 110 for sliding movement of the strap 135. The loop 140 is graspable by a user to pull the strap 135 through the guide loop 95. In another embodiment, the second end of the strap 135 omits the loop 140, such that the second end of the strap 135 is graspable by the user to pull the strap 135 through the guide loop 95. In other embodiments the actuator 75 may include a user graspable element other than the illustrated loop 140, such as a rigid handle.

When a user pulls the strap 135 through the guide loop 95, the middle portion of the strap 135 becomes taut and bears against the plate 120, such that the taut strap 135 urges the support panel 110 toward the first position. When released by a user, the strap 135 becomes relaxed and the support panel 110 is moveable with respect to the back frame 60 by a user. The illustrated strap 135 is operable to move the support panel 110 toward the first position, but is not operable to move the support panel 110 toward the second position because the strap 135 transmits force only in tension (i.e., it can pull but not push). When a user pulls the strap 135 and the support panel 110 moves toward the first position, the strap 135 is considered to move in a first direction.

Movement of the support panel 110 toward the second position requires the strap 135 to move in a second direction opposite the first direction. In the illustrated embodiment, the strap 135 is moved in the second direction by a user pushing against the support panel 110. In another embodiment, a second strap is provided, and the user moves the support panel 110 toward the second position by pulling on the second strap. In another embodiment, a rigid actuator is provided to urge the support panel 110 both toward the first position and toward the second position when actuated by the user. In still another embodiment, a motor or other mechanical or electrical actuator can be utilized to urge the support panel 110 to the first position and/or to the second position. Other actuators, such as rigid or non-rigid actuators can be utilized, and the illustrated strap 135 and loop 140 configuration is given by way of example only.

In some embodiments, an actuator is omitted because a user presses against the support panel 110 to move the support panel 110 between the first and second positions. In some such embodiments, a two position (or multi-position) detent mechanism is utilized to retain the support panel 110 in the first position, the second position and any of a desired number of positions between the first and second positions. The user can push and/or pull the support panel 110 toward the first position or toward the second position to overcome the detent(s) and thereby move the support panel 110.

The illustrated cushion release mechanism 80 is a cam buckle including a frame and a jaw pivotable with respect to the frame. The cam buckle frame is mounted to the L-shaped bracket of the upper frame portion. One suitable cushion release mechanism 80 is a 1", 170H Die Cast Spring Cam Buckle supplied by American Cord & Webbing. The jaw is biased by a spring against the strap 135 which passes between the jaw and frame, sandwiching the strap against the frame. The jaw is pivoted by a user against the bias of the spring and out of abutment with the strap 135, and this is referred to as "actuation" of the cushion release mechanism 80. When the user pulls on the strap 135 to move the strap 135 in the first direction, the strap 135 is permitted to slide between the jaw and the frame. Therefore, the user can pull the strap 135 in the first direction without actuating the cushion release mechanism 80. However, movement of the strap 135 in the second direction is inhibited by the jaw and the frame. Upon actuation of the cushion release mechanism 80, the strap 135 is permitted to move in the second direction. Specifically, rotation of the jaw with respect to the frame frees the strap 135 to move in the second direction.

The orientation of the cam buckle can be reversed, such that the strap 135 is permitted to move in the first direction only upon actuation, but is permitted to move in the second direction without or without actuation. Such an arrangement might be useful in a release mechanism for a second strap, for example. In some embodiments, the jaw includes at least one tooth to increase friction between the jaw and the strap 135. In some embodiments, the jaw includes a knurled portion that engages the strap 135. Other suitable mechanical release mechanisms can be utilized, such as a cam lever, that has a first position, in which the strap 135 is inhibited from moving in at least one direction and a second position, in which the strap 135 is permitted to move in one or more directions. In some embodiments, a two-way locking mechanism is utilized to permit movement of the strap 135 in either of the first and second directions only upon actuation. As noted above, some embodiments omit the actuator. These and other embodiments can omit the cushion release mechanism. A detent or other positive locking mechanism can be utilized to retain the support panel 110 in the first and/or second positions. Other non-positive locking mechanisms, such as gravity, can be utilized in some embodiments.

The stationary back cushion 85 is coupled to the back frame 60. The stationary back cushion 85 is substantially rectangular and defines an opening 150. The illustrated opening 150 is substantially rectangular and substantially centrally positioned in the stationary back cushion 85. When a user adjusts the angle of the seat back assembly 40 with respect to the lower portion 35, the stationary back cushion 85 is rotatable along with the back frame 60 with respect to the lower cushion 50 and lower frame, but is stationary with respect to the back frame 60. The stationary back cushion 85 defines a front surface operable to support a user and a rear surface engageable with the back frame 60. The illustrated front surface is curvilinear, but in other embodiments, at least a portion of the front surface is planar.

The moveable back cushion 90 is coupled to the support panel 110 and is moveable with the support panel 110 with respect to the back frame 60 and the stationary back cushion 85. The moveable back cushion 90 is substantially rectangular and is sized to fit into the opening 150 in the stationary back cushion 85. The moveable back cushion 90 defines a front surface operable to support a user and a rear surface coupled to the support panel 110. The illustrated front surface is curvilinear, but in other embodiments, at least a portion of the front surface is planar. In the illustrated embodiment, the moveable back cushion 90 and the support panel 110 together define an adjustable support. In some embodiments, an adjustable support includes only a support panel 110 or a moveable back cushion 90. Other examples of a single piece adjustable support include a piece of firm foam, a covered board or an injection molded panel.

As shown in FIGS. 2-6, when the support panel 110 is in the first position, the moveable back cushion 90 is positioned within the opening 150 of the stationary back cushion 85. When the support panel 110 is in the first position, the front surface of the stationary back cushion 85 and the front surface of the moveable back cushion 90 cooperate to provide a substantially unbroken, continuous support surface. As shown in FIGS. 7-11, when the support panel 110 is in the second position, the moveable back cushion 90 is removed from the opening 150 of the station back cushion. When the support panel 110 is in the second position, the moveable back cushion 90 is recessed with respect to the stationary back cushion 85. The moveable back cushion 90 remains coupled to the stationary back cushion 85 by the connection between the back frame 60 and the cushion support mechanism 70 at all positions between the first position and the second position. This is advantageous because in designs that have separable cushions, one or more of the cushions must be stored somewhere when not in use, and can be misplaced.

In operation, the user pulls the strap 135 in the first direction to move the support panel 110 and the moveable back cushion 90 into the first position. The cushion release mechanism 80 resists, by way of tension in the strap 135, movement of the support panel 110 and the moveable back cushion 90 in the second direction unless actuated. When actuated, the cushion release mechanism 80 permits movement of the support panel 110 and the moveable back cushion 90 in the second direction. Such movement is caused by a user pushing against the moveable back cushion 90, in the illustrated embodiment. The moveable back cushion 90 can be moved by a backpack of a user in the seat assembly 30, such that the opening 150 at least partially receives the backpack therein. The seat assembly 30 can accommodate a variety of equipment carried by a user, such as backpacks, canteens, water containers, food supplies, weapons, and the like, and still provide the necessary support to the user. The user can adjust the position of the moveable back cushion 90 while sitting on the seat assembly 30.

Further, the moveable back cushion 90 only recesses from the stationary back cushion 85 as much as is necessary to compensate for the equipment of the user. For example, if a user is wearing a small backpack, the moveable back cushion 90 will recess a first distance, and if the user is wearing a large backpack, the moveable back cushion 90 will recess a second distance, greater than the first distance. The moveable back cushion 90 recesses up to the maximum distance 130, shown in FIG. 11. In one embodiment, the maximum distance 130 is approximately three inches. In another embodiment, the maximum distance 130 is five inches. In some embodiments, the moveable back cushion 90 is completely removed from the opening 100 when at the maximum recessed position. In some embodiments, the front surface of the moveable back cushion 90 is substantially level or co-planar with the back of the stationary back cushion 85 in the maximum recessed position.

Thus, when the moveable back cushion 90 is in the first position (shown in FIGS. 2-6), the movable and stationary back cushions provide a substantially continuous surface and the seat assembly 30 is shaped to support a user comfortably without any equipment on the user's back. When the moveable back cushion 90 is in the second position (shown in FIGS. 7-11), or any position between the first position and the second position, the moveable back cushion 90 is recessed from and substantially parallel to the stationary back cushion 85. Thus, when the moveable back cushion 90 is recessed from the stationary back cushion 85, the seat assembly 30 is shaped to support a user comfortably with equipment, such as a backpack on the user's back. The user can adjust the distance that the moveable back cushion 90 is recessed from the stationary back cushion 85 while sitting on the seat assembly 30 by either actuating the cushion release mechanism 80 or pulling on the strap 135.

Thus, the invention provides, among other things, a vehicle seat that can accommodate a back pack or other article of equipment to maximize user comfort and support. Various features and advantages of the invention are set forth in the following claims.

What is claimed is:

1. A seat assembly comprising:
   a lower portion adapted to support from below an occupant of the seat;
   a back frame extending upwardly with respect to the lower portion;
   an adjustable support moveable between a first position and a second position with respect to the back frame;
   a stationary back cushion mounted to the back frame and defining an opening sized to receive the adjustable support; and
   an actuator operable by the user to move the adjustable support relative to the back cushion;
   wherein when the adjustable support is positioned in the opening, both the adjustable support and the stationary back cushion provide support surfaces for the back of an occupant of the seat;
   wherein when the adjustable support is moved toward the second position to at least partially remove the adjustable support from the opening, the opening accommodates equipment of an occupant of the seat assembly; and
   wherein the adjustable support is substantially parallel to the stationary back cushion in both the first position and the second position, and the adjustable support is substantially parallel to the stationary back cushion at all positions between the first position and the second position.

2. The seat assembly of claim 1, wherein the adjustable support is infinitely adjustable to permit the adjustable support to be positioned at any location between the first and second positions.

3. A seat assembly comprising:
   a lower portion adapted to support from below an occupant of the seat;
   a back frame extending upwardly with respect to the lower portion;
   an adjustable support moveable between a first position and a second position with respect to the back frame; and
   a stationary back cushion mounted to the back frame and defining an opening sized to receive the adjustable support;
   wherein when the adjustable support is positioned in the opening, both the adjustable support and the stationary back cushion provide support surfaces for the back of an occupant of the seat;
   wherein when the adjustable support is moved toward the second position to at least partially remove the adjustable support from the opening, the opening accommodates equipment of an occupant of the seat assembly;
   wherein the adjustable support is infinitely adjustable to permit the adjustable support to be positioned at any location between the first and second positions, and
   wherein the adjustable support is moveable through a range of motion between the first position in which the adjustable support is received within the opening such that both the adjustable support and the stationary back cushion provide support surfaces for the back of an occupant of the seat, and the second position in which the adjustable support is fully removed from the opening.

4. The seat assembly of claim 1, wherein the adjustable support includes a cushion coupled to a support panel and at least one linkage coupled to the support panel, the at least one linkage permitting the cushion and the support panel to move between the first position and the second position.

5. The seat assembly of claim 1, wherein the adjustable support is substantially rectangular and the opening of the stationary back cushion is substantially rectangular, and wherein the adjustable support is received within the opening in the first position.

6. The seat assembly of claim 3, further comprising an actuator operable by the user to move the adjustable support relative to the back cushion.

7. A seat assembly comprising:
   a lower portion adapted to support from below an occupant of the seat;
   a back frame extending upwardly with respect to the lower portion;
   an adjustable support moveable between a first position and a second position with respect to the back frame;
   a stationary back cushion mounted to the back frame and defining an opening sized to receive the adjustable support; and
   an actuator operable by the user to move the adjustable support relative to the back cushion;
   wherein when the adjustable support is positioned in the opening, both the adjustable support and the stationary back cushion provide support surfaces for the back of an occupant of the seat;
   wherein when the adjustable support is moved toward the second position to at least partially remove the adjustable support from the opening, the opening accommodates equipment of an occupant of the seat assembly; and
   wherein the actuator is a strap graspable by a user, and further comprising a cam buckle for selectively inhibiting movement of the strap, which thereby inhibits movement of the adjustable support toward the second position.

8. The seat assembly of claim 1, wherein the adjustable support includes a support panel coupled to the back frame for movement with respect to the back frame.

9. The seat assembly of claim 1, wherein the adjustable support is moveable between the first position and the second position by a user when the user is sitting on the lower portion.

10. The seat assembly of claim 3, wherein the adjustable support is substantially parallel to the stationary back cushion in both the first position and the second position, and the adjustable support is substantially parallel to the stationary back cushion at all positions between the first position and the second position.

11. A seat back assembly for a vehicle seat, the seat back assembly comprising:
    a back frame;
    an adjustable support mounted to the back frame moveable between a first position and a second position with respect to the back frame; and
    a stationary back cushion mounted to the back frame and defining an opening sized to receive the adjustable support;
    wherein when the adjustable support is positioned in the opening, both the adjustable support and the stationary back cushion provide support surfaces for the back of an occupant of the seat;
    wherein when the adjustable support is moved toward the second position to at least partially remove the adjustable support from the opening, the opening accommodates equipment of an occupant of the seat;
    wherein the adjustable support is infinitely adjustable to permit the adjustable support to be positioned at any location between the first and second positions; and
    wherein the adjustable support is movable through a range of motion between the first position in which the adjustable support is received within the opening such that both the adjustable support and the stationary back cushion provide support surfaces for the back of an occupant of the vehicle seat, and the second position in which the adjustable support is fully removed from the opening.

12. A seat back assembly for a vehicle seat, the seat back assembly comprising:
    a back frame;
    an adjustable support mounted to the back frame and moveable between a first position and a second position with respect to the back frame; and
    a stationary back cushion mounted to the back frame and defining an opening sized to receive the adjustable support;
    an actuator operable by a user to move the adjustable support relative to the back cushion; and
    wherein when the adjustable support is positioned in the opening, both the adjustable support and the stationary back cushion provide support surfaces for the back of an occupant of the seat;
    wherein when the adjustable support is moved toward the second position to at least partially remove the adjustable support from the opening, the opening accommodates equipment of an occupant of the seat; and
    wherein the adjustable support is substantially parallel to the stationary back cushion in both the first position and the second position, and the adjustable support is substantially parallel to the stationary back cushion at all positions between the first position and the second position.

13. The seat back assembly of claim 12, wherein the adjustable support is moveable through a range of motion between the first position in which the adjustable support is received within the opening such that both the adjustable support and the stationary back cushion provide support surfaces for the back of an occupant of the vehicle seat, and the second position in which the adjustable support is fully removed from the opening.

14. The seat back assembly of claim 11, wherein the adjustable support includes a cushion coupled to a support panel, and at least one linkage coupled to the support panel and to the back frame, wherein the at least one linkage supports the support panel for movement with respect to the back frame.

15. The seat back assembly of claim 11, wherein the adjustable support is substantially rectangular, and the opening is substantially rectangular, such that the opening receives the adjustable support.

16. The seat back assembly of claim 11, further comprising an actuator operable by a user to move the adjustable support relative to the back cushion.

17. A seat back assembly for a vehicle seat, the seat back assembly comprising:
    a back frame;
    an adjustable support mounted to the back frame and moveable between a first position and a second position with respect to the back frame;
    a stationary back cushion mounted to the back frame and defining an opening sized to receive the adjustable support; and
    an actuator operable by a user to move the adjustable support relative to the back cushion;
    wherein when the adjustable support is positioned in the opening, both the adjustable support and the stationary back cushion provide support surfaces for the back of an occupant of the seat;
    wherein when the adjustable support is moved toward the second position to at least partially remove the adjustable support from the opening, the opening accommodates equipment of an occupant of the seat; and wherein the actuator is a strap graspable by a user, and further comprising a cam buckle for selectively inhibiting movement of the strap, which thereby inhibits movement of the adjustable support toward the second position.

18. The seat back assembly of claim 17, wherein the adjustable support includes a support panel coupled to the back frame for movement with respect to the back frame.

19. The seat back assembly of claim 11, wherein the adjustable support is moveable between the first position and the second position by a user when the user is sitting in the vehicle seat.

20. The seat back assembly of claim 12, wherein the adjustable support is infinitely adjustable to permit the adjustable support to be positioned at any location between the first and second positions.

\* \* \* \* \*

UNITED STATES PATENT AND TRADEMARK OFFICE
CERTIFICATE OF CORRECTION

PATENT NO. : 8,459,735 B2  
APPLICATION NO. : 13/110649  
DATED : June 11, 2013  
INVENTOR(S) : Pieter J. van Zyl et al.

Page 1 of 1

It is certified that error appears in the above-identified patent and that said Letters Patent is hereby corrected as shown below:

In the Claims:

Column 8, line 13: After the phrase "to the back cushion;" and before the word "wherein", insert the phrase --wherein the adjustable support is fully removed from the opening in the second position;--

Column 8, line 51: Delete the phrase "to permit the" and replace with the phrase --by an actuator to position the--

Column 8, line 52: After the phrase "adjustable support" delete the phrase "to be positioned"

Column 9, line 62: After the phrase "is infinitely adjustable" delete the phrase "to permit the" and replace with the phrase --by an actuator to position the--

Column 9, line 63: After the phrase "adjustable support" delete the phrase "to be positioned"

Column 10, line 15: After the phrase "to the back cushion; and" insert the phrase --wherein the adjustable support is fully removed from the opening in the second position;--

Signed and Sealed this  
Seventeenth Day of September, 2013

Teresa Stanek Rea  
*Deputy Director of the United States Patent and Trademark Office*